UNITED STATES PATENT OFFICE.

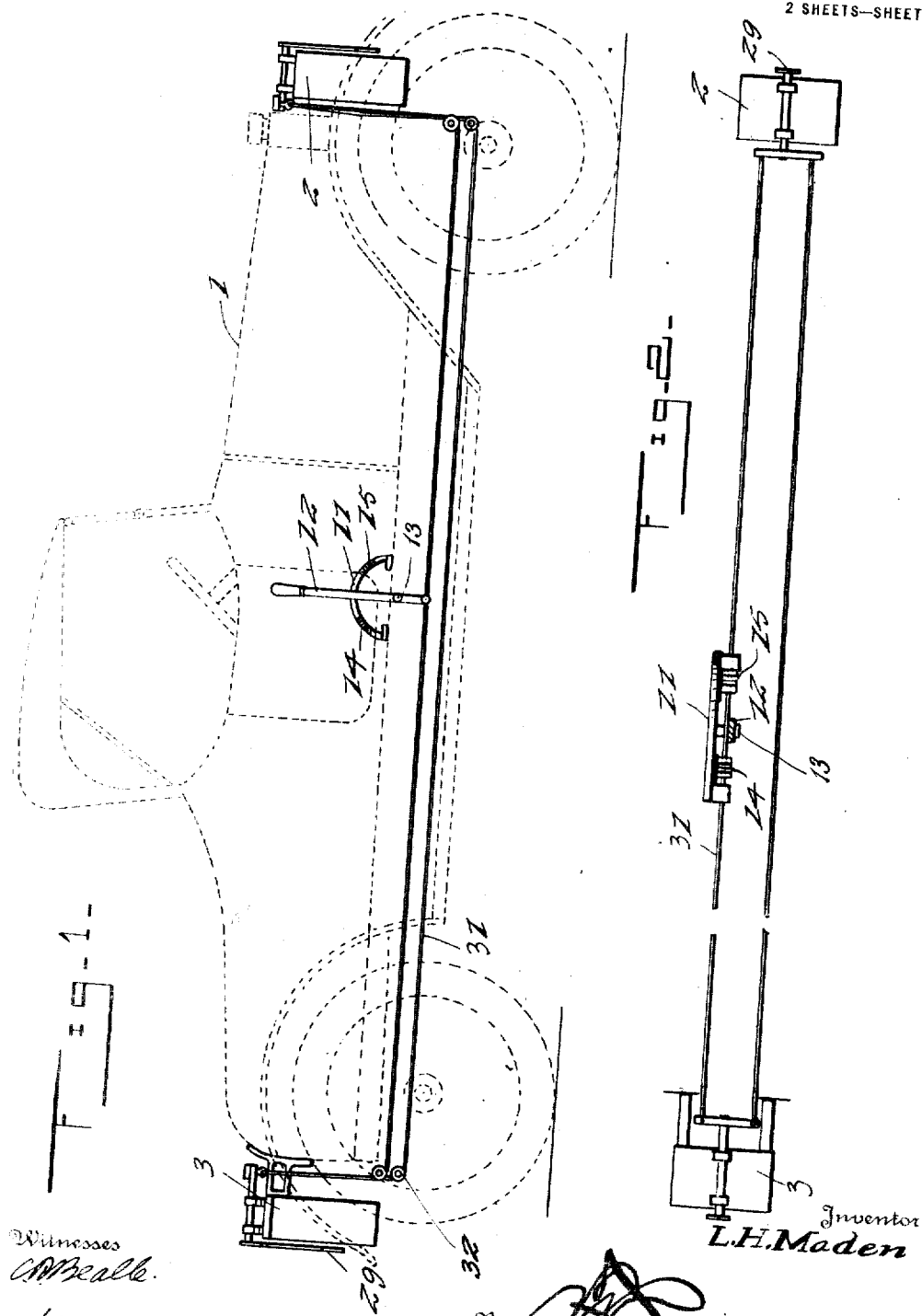

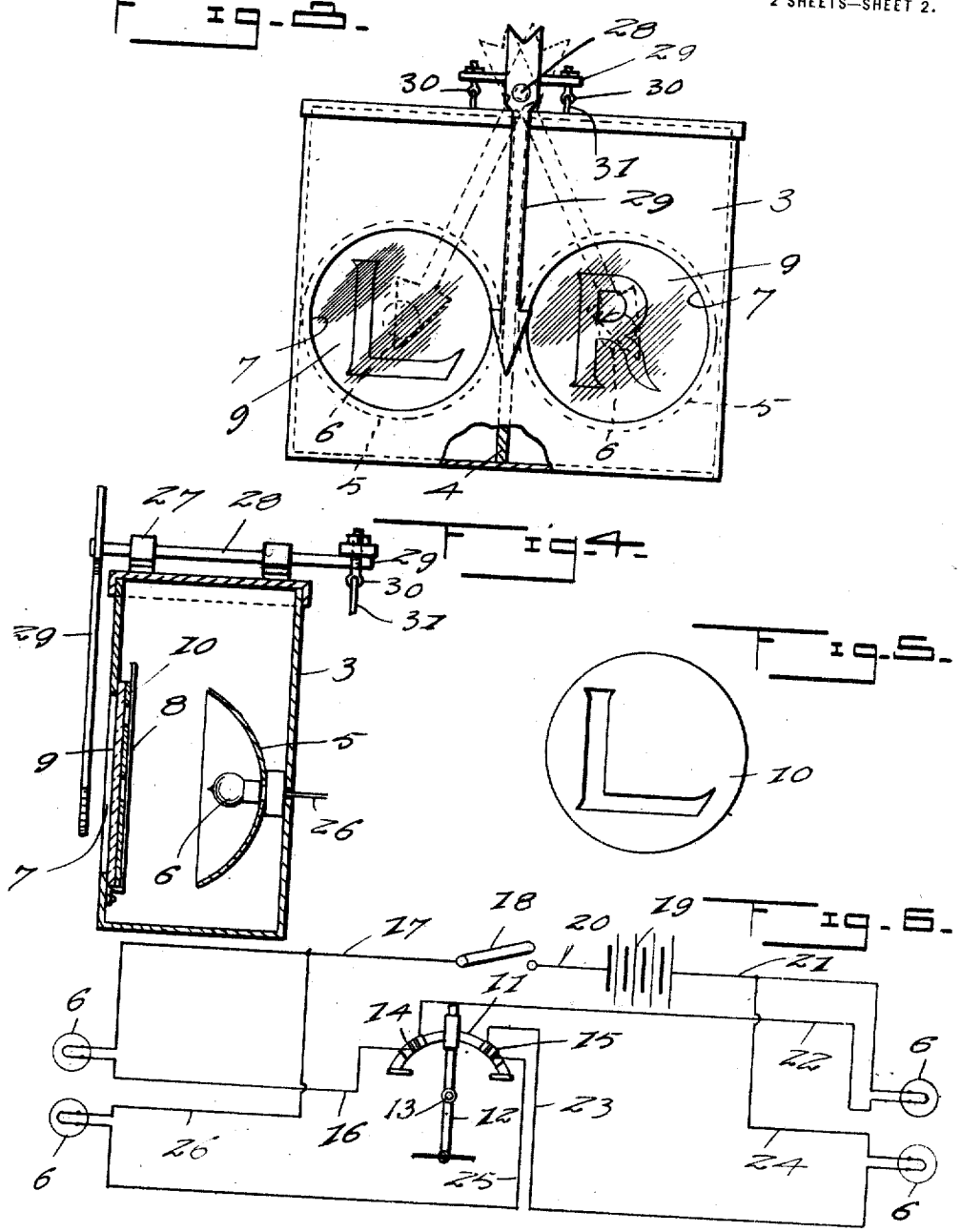

LLOYD H. MADEN, OF JONESBORO, TENNESSEE.

AUTOMOBILE-SIGNAL.

1,265,691.

Specification of Letters Patent.

Patented May 7, 1918.

Application filed January 27, 1917. Serial No. 144,900.

*To all whom it may concern:*

Be it known that I, LLOYD H. MADEN, a citizen of the United States, residing at Jonesboro, in the county of Washington and State of Tennessee, have invented certain new and useful Improvements in Automobile-Signals; and I do hereby declare the following to be a full, clear, and exact description of the invention, such as will enable others skilled in the art to which it appertains to make and use the same.

This invention relates to an automobile signal and has for one of its objects the provision of means whereby the operator of the automobile may notify traffic in front and rear of the automobile in which direction a turn is contemplated prior to making the turn.

Another object of this invention is the provision of casings secured to the front and rear of the automobile each having direction indicating means thereon adapted to be operated by the operator of the automobile simultaneously to indicate in which direction a turn is to be made.

A further object of this invention is the provision of means whereby the signal may be visible at night time as well as by day time.

A further object of this invention is the provision of indicating arrows carried by the casing and electric lamps, which arrows are adapted to be swung about their pivots to indicate in which direction the turn is to be made and whereby the electric lamps may be illuminated simultaneously with the movement of the arrows so as to make the device readable to the traffic at night time.

A further object of this invention is the provision of a lever operatively connected to the arrows for swinging said arrows in either direction to indicate in which direction the automobile is going to turn and said lever also adapted to close electrical contacts to complete electric circuits to the electric lamps.

A still further object of this invention is the provision of an automobile signal of the above stated character, which shall be simple, durable and efficient, and which may be manufactured and sold at a comparatively low cost.

With these and other objects in view, as will become more apparent as the description proceeds, the invention consists of certain novel features of construction, combination and arrangement of parts as will be hereinafter more fully described and claimed.

In the drawing:

Figure 1 is a side elevation of an automobile illustrating an automobile signal applied thereto and constructed in accordance with my invention, Fig. 2 is a plan view partly in section of the automobile signal removed from the automobile, Fig. 3 is a front elevation partly in section of one of the casings, Fig. 4 is a transverse sectional view of one of the casings, illustrating the electric lamps mounted therein, Fig. 5 is a plan view of a stenciled plate, Fig. 6 is a diagrammatical view of the wiring diagram, and Fig. 7 is a detail view illustrating one pair of the contacts.

Referring in detail to the drawing, the numeral 1 indicates an automobile having secured to the front and rear thereof casings 2 and 3. The casings 2 and 3 are identical in construction and reference to one is thought to be sufficient for both.

A transverse partition 4 divides the casing into a pair of compartments and having secured to the rear wall of each compartment a reflector 5 in which electric lamps 6 are mounted. The front wall of the casing is provided with a pair of circular openings 7 one of which is disposed in front of each of the compartments, and are surrounded by suitable guides 8 in which are mounted glass plates 9 that are backed by stenciled plates 10. The plates 10 are stenciled in the formation of direction indicating characters such as "L" and "R," standing for "left" and "right," however, the entire word "left" or "right" may be stenciled in the plates 10 if desired. The direction indicating character "R" is disposed in front of one of the compartments, while the direction indicating character "L" is disposed in front of the other compartment, whereby upon illuminating either of the electric lamps 6, the corresponding indicating character to the respective compartment will be illuminated.

A quadrant 11 is secured to the automobile 1 and has operatively connected therewith an operating lever 12, which is pivoted to the automobile as illustrated at 13. Mounted upon each end of the quadrant 11 are contacts 14 and 15, each consisting of a pair of resilient arms adapted to be normally spaced apart. A conductor 16 is connected to one of the resilient arms of the contact 14 and to one of the electric lamps 6 which is located within the casing 3 and behind the direction indicating character "L." Connected to the electric lamps is a conductor 17, which is connected to a switch 18. Connected to the switch 18 is a storage battery 19 by a conductor 20. A conductor 21 is connected to the storage battery and to one of the electric lamps 6 located within the casing 2 in the rear of the direction indicating character "R." Connected to the electric lamp last mentioned is a conductor 22 which is connected to the other resilient arm of the contact 14, whereby upon moving the arms of the contact 14 into engagement with each other, and having the switch 18 closed, an electric circuit will be completed to the electric lamp located within the casings 2 and 3 in the rear of the direction indicating character "L," thus notifying the traffic that a turn is to be made to the left. A conductor 23 is connected to one of the resilient arms of the contact 15 and to the electric lamp located in the casing 2 in rear of the direction indicating character "R" and the electric lamp has connected thereto a conductor 24, which is connected to the conductor 21. A conductor 25 is connected to and to other resilient arm of the contact 15 and to the electric lamp 6 which is located within the casing 3 behind the direction indicating character "R" and said electric lamp has connected thereto a conductor 26, which is connected to the conductor 17, whereby upon bringing the resilient arms of the contact 15 into engagement with each other, an electric circuit will be completed simultaneously to the electric lamp located in the casings 2 and 3 behind the direction indicating character "R," thereby notifying the traffic that a turn is to be made to the right. The resilient arms of the contacts 14 and 15 are adapted to be operated by the movement of the lever 12.

Suitable brackets 27 are secured to the top walls of the casings 2 and 3 and have journaled therein shafts 28. The shafts 28 have secured to one of their ends downwardly depending arrows 29, which normally maintain a vertical position, as illustrated in Fig. 3 in full lines, or a point between the direction indicating characters. Secured to the other ends of the shafts 28 are arms 29′ having eyebolts 30, secured to each end thereof. Cables 31 are connected to the eyebolts 30 and pass over pulleys 32 secured to the automobile and has other ends connected to the lower ends of the lever 12. One of the cables, instead of connecting to the lower end of the lever 12 extends from one of the arms which is carried by the rear casing 3 to the arm which is carried by the front casing 2, whereby upon moving the lever forwardly, the direction indicating arrows will be swung to overlie the direction indicating character "L" to indicate that a turn is to be made to the left and when the lever is moved in a reverse direction, the arrows are moved to overlie the direction indicating character "R" to indicate that a turn to the right is going to be made.

From the foregoing description taken in connection with the accompanying drawings, it will be noted that an automobile signal has been provided which may be readily and quickly applied to an automobile and which may be of use in day time and night for notifying the traffic in front and rear of the automobile simultaneously in which direction the automobile is going to turn.

While I have shown and described the preferred embodiment of my invention, it will be understood that minor changes in construction, combination and arrangement of parts may be made without departing from the spirit and scope of the invention as claimed.

What is claimed is:

An automobile signal comprising a casing having spaced characters on the front wall thereof, spaced bearings carried by the top wall of the casing, a shaft journaled in said bearings and projecting beyond the front wall of the casing, an indicating member secured to the shaft and depending downwardly over the front wall and normally disposed between the characters, and means for oscillating the shaft to cause the indicating member to point to either of the characters.

In testimony whereof I affix my signature in presence of two witnesses.

LLOYD H. MADEN.

Witnesses:
 JAMES M. JOHNSON,
 WAYNE D. CHASE.